United States Patent [19]

Shah et al.

[11] Patent Number: 5,324,158

[45] Date of Patent: Jun. 28, 1994

[54] APPARATUS FOR FILLING A SILO WITH TOBACCO AND THE LIKE

[75] Inventors: Bipin G. Shah, Macon, Ga.; Clayton N. Emery, Middletown, Ky.; James H. Herring, Macon, Ga.

[73] Assignee: Brown & Williamson Tobacco Corp., Louisville, Ky.

[21] Appl. No.: 20,068

[22] Filed: Feb. 19, 1993

Related U.S. Application Data

[63] Continuation-in-part of Ser. No. 708,031, Jun. 3, 1991, abandoned.

[51] Int. Cl.⁵ ............................................. B65G 15/22
[52] U.S. Cl. .................................... 414/294; 198/603; 198/574; 414/288; 414/300; 414/272
[58] Field of Search .............. 414/287, 288, 289, 293, 414/294, 295, 296, 298, 300, 303, 304, 323, 325, 326, 327, 139.1, 139.3, 140.2, 140.8, 142.1, 137.1, 268, 269, 270, 271, 272, 157, 171; 198/371, 631, 574, 547, 603, 606, 750, 362, 312, 535

[56] References Cited

U.S. PATENT DOCUMENTS

| | | | |
|---|---|---|---|
| 3,149,734 | 9/1964 | Ilmoni | 198/574 X |
| 3,735,881 | 5/1973 | Wilding | 414/300 X |
| 3,780,886 | 12/1973 | Allen | 414/295 |
| 4,119,193 | 10/1978 | Smith et al. | 414/288 X |
| 4,619,576 | 10/1986 | George et al. | 414/272 X |
| 4,622,890 | 11/1986 | Swanson | 198/603 X |
| 4,948,322 | 8/1990 | Kunstmann | 414/300 |
| 5,004,400 | 4/1991 | Handke | 414/294 X |

FOREIGN PATENT DOCUMENTS

| | | | |
|---|---|---|---|
| 1281946 | 10/1968 | Fed. Rep. of Germany | 198/574 |
| 1369564 | 7/1964 | France | 414/293 |
| 97521 | 4/1988 | Japan | 414/300 |

Primary Examiner—Frank E. Werner
Attorney, Agent, or Firm—Jim Eaves; Charles G. Lamb

[57] ABSTRACT

A material handling apparatus for selectively bulk filling or blend filling and concurrently discharging particulate material, such as reticulated tobacco and the like, into an open topped silo, bin, or hopper. The material handling apparatus includes a first shuttle car located over the open top of the silo for movement back and forth over the silo, a first belt conveyor on the first shuttle car in alignment with the direction of movement of the first shuttle car, a second shuttle car located over the top of the silo and above the first shuttle car for movement back and forth over the silo along a path parallel to the movement of the first shuttle car, and a second belt conveyor on the second shuttle in alignment with the direction of movement of the second shuttle car.

7 Claims, 10 Drawing Sheets

FIG.10F

APPARATUS FOR FILLING A SILO WITH TOBACCO AND THE LIKE

REFERENCE TO RELATED APPLICATIONS

The present application is a continuation-in-part of Ser. No. 07/708,031 filed Jun. 3, 1991, now abandoned.

BACKGROUND OF THE INVENTION

The present invention relates generally to material handling apparatus, and more particularly to a material handling apparatus which provides for selectively bulk filling or blend filling and concurrently discharging particulate material into a hopper, bin, silo and the like.

A particular application for such material handling apparatus is in the manufacture of cigarettes. In the manufacture of cigarettes, tobacco is processed as by cutting, shredding, grinding and the like into small pieces or particles in preparation for processing into the tobacco rod of a cigarette. Extremely large quantities of tobacco are used in the manufacture of cigarettes, and this tobacco must be processed rapidly through the cigarette manufacturing process. In addition, because the manufacturing process must be adaptable to make cigarettes of different blends or a single blend, the apparatus must be versatile.

Prior known material handling apparatus for conveying and feeding particulate material is known, per se, from the following U.S. Patents.

U.S. Pat. No. 3,184,038 is directed to a material handling apparatus for conveying and feeding particulate material which has a top or first conveyor discharging onto a second or bottom conveyor. The bottom conveyor is pivotally mounted at its upstream end for movement in a horizontal plane.

U.S. Pat. No. 3,435,967 is directed to a material handling system for filling a bin with free flowing material which includes a first conveyor belt which selectively feeds material to one or the other of two other conveyor belts mounted transversely at the opposite ends of the first conveyor belt.

U.S. Pat. No. 3,530,973 is directed to a feed conveying and distributing apparatus for feeding particulate material which includes a first or top stationary conveyor belt feeding material onto a second or bottom shuttle conveyor belt which then feeds the particulate material to a third conveyor located beneath the second conveyor.

Even more particularly, material handling or feed conveyor systems for conveying and feeding tobacco to hoppers, bins, silos and the like are known, per se, from the following patents.

U.S. Pat. No. 3,735,881 and U.S. Pat. No. 3,811,585 disclose essentially the same material handling apparatus for bulk filling and blend filling tobacco into a silo. The material handling apparatus includes a shuttle car movable back-and-forth over the top of the silo and a reversible belt conveyor mounted on the shuttle car having a conveying direction in alignment with the movement of the shuttle car. An index or cross shuttle car is located above the main shuttle car and perpendicular to the silo to feed tobacco to the conveyor belt of the main shuttle car. The cross shuttle car extends beyond the sides of the silo.

U.S. Pat. No. 4,619,576 is directed to a feed system for tobacco blending in bulk bins or silos which include a trolley movable over two side-by-side bins. A first belt conveyor is mounted on the trolley for movement thereon transversely to the movement of the trolley and a feed conveyor is located above the first conveyor at an angle thereto with its discharge end over the first conveyor. The feed conveyor is also mounted for movement transversely to the movement of the trolley as the first conveyor moves to maintain its discharge end over the first conveyor.

The present invention provides a material handling apparatus for selectively bulk filling and blend filling particulate material, such as tobacco, into a hopper, bin, or silo which is an improvement to the described apparatus.

SUMMARY OF THE INVENTION

More particularly, the present invention provides a material handling apparatus for selectively bulk filling and blend filling an open topped elongated silo comprising:

an elongated silo having a length much greater than its width and an open top and a bottom;

a lower conveyor mounted along said bottom;

a first shuttle car;

means for mounting the first shuttle car over the top of the silo for movement along the length of the silo;

means for indexing the length of travel of said first shuttle car;

means for selectively moving the first shuttle car along the length of the silo on the first shuttle car mounting means;

a first belt conveyor mounted on the first shuttle car for conveying in directions in alignment with movement of the first shuttle car on the first shuttle car mounting means;

a second shuttle car;

means for mounting the second shuttle car over the top of the silo and above the first shuttle car for movement along the length of the silo;

means for positioning said second shuttle car;

means for selectively moving the second shuttle car in either direction along the length of the silo on the second shuttle mounting means;

a second belt conveyor mounted on the second shuttle car for conveying in directions in alignment with movement of the second shuttle car on the second shuttle car mounting means; and means to move said second belt conveyor in response to movement of said floor conveyor.

Even more particularly the present invention provides a method of selectively filling and discharging particulate material from a silo including the steps of:

adding particulate material into an open top of a silo having a discharge conveyor, said particulate material being disposed in a first batch on said discharge conveyor;

adding particulate material into said open top of said silo in at least a second batch on said discharge conveyor at a location distinct from said first batch; and discharging said first batch from said silo simultaneously with said adding particulate material to said at least a second batch on said discharge conveyor.

BRIEF DESCRIPTION OF THE DRAWINGS

A better understanding of the invention will be had upon reference to the following discussion in conjunction with the accompanying drawings wherein like numerals refer to like parts throughout the several views and wherein.

DETAILED DESCRIPTION OF THE PREFERRED EMBODIMENT

Figure 1:
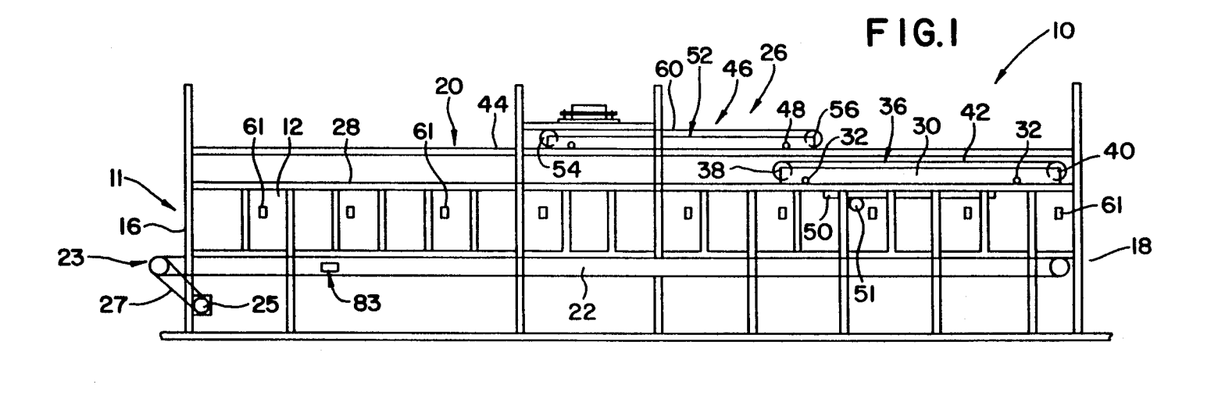
FIG. 1 is a schematic side view of a silo with the material handling apparatus of the present invention.
Figure 2:
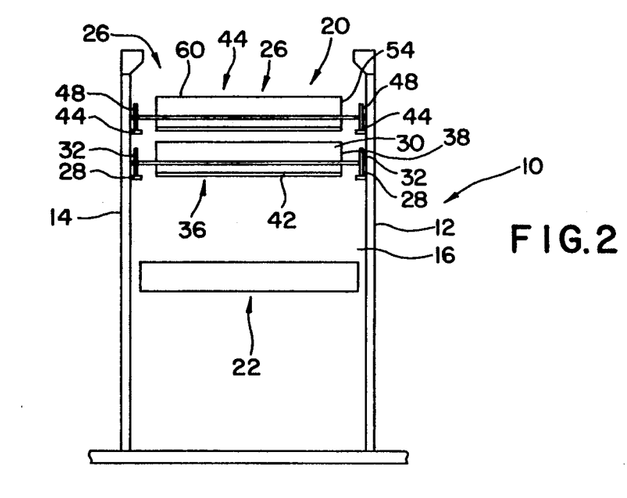
FIG. 2 is a front view of the silo and material handling apparatus of FIG. 1.

With reference to FIGS. 1 and 2, there is shown a silo, generally denoted as the numeral 10, for receiving particulate material, such as tobacco, to be processed into cigarettes. The silo 10 is of conventional design and is elongated having a length much greater than its width. The silo 10 has side walls 12, 14, a downstream end wall 16, and an upstream end wall 18. The silo 10 has an open top 20 and a floor conveyor 22 as the floor of the silo 10. The discharge end 23 of the floor conveyor 22 is located near and spaced from the downstream end wall 16 to define a tobacco outlet between the discharge end 23 of the conveyor 22 and the downstream end wall 16. A plurality of doffer rollers 24 can be located at the downstream end wall 16 above the belt conveyor 22 and discharge outlet to aid in the discharge of tobacco particles from the silo 10.

The floor conveyor 22 can be, for example, an endless belt conveyor having a head pulley proximate the downstream end wall 16 and a tail pulley proximate the upstream end wall 18 of the silo 10. The endless belt of the floor conveyor 22 can be, for example, a solid continuous belt or of a slat type formed of adjacent slats extending transversely of the conveyor belt. As is conventional practice, the floor conveyor 22 can be driven by, for example, a motor 25 operatively connected to the head pulley of the floor conveyor 22 by a drive belt 27. The floor conveyor 22 also includes counter means 83 for counting the distance the belt has traveled at any given time. Various counter means known to the art can be utilized for this purpose. For example, if the belt of the floor conveyor 22 is of the slat type, the counter device can count the number of slats moved past a given location, or the counter device can be of the type which counts the number of revolutions made by the conveyor head pulley or conveyor drive motor 25.

With continued reference to FIGS. 1, 2, 3, and 4, there is shown the material handling apparatus, generally denoted as the numeral 26, of the present invention located over the open top 20 of the silo 10. The material handling apparatus 26 includes a first bottom pair of tracks 28 affixed to the silo 10 and extending longitudinally of the silo 10, and a first or bottom shuttle car 30 having track engagement wheels 32 contacting the tracks 28 such that the first shuttle car 30 is movable on the tracks 28 in the longitudinal direction of the silo 10. Various drive means can be employed for moving the first shuttle car 30 on the tracks 28. For example, the shuttle car 30 can include an electric motor for directly driving the wheels 32 through a drive belt. However, as shown, the first shuttle car 36 has a rack gear 50 attached at its bottom side and an electric motor driven pinion gear 51 affixed to the side wall 18 or the silo 10 in meshing engagement with the rack gear 50. The motor driving the pinion gear 51 is reversible so that the first shuttle car 36 can be selectively driven either in a forward direction toward the silo downstream end wall 16 or toward the side upstream end wall 18. A first or bottom belt conveyor apparatus 36 is mounted on the first shuttle car 30 with its conveying direction, that is, direction of belt movement, in alignment with the movement of the first shuttle car 30 on the tracks 28. The first belt conveyor apparatus 36 includes a head pulley 38, a tail pulley 40 drivingly connected to a motor 41 by means of, for example, a drive belt 37, and a continuous belt 42 trained about the head pulley 38 and tail pulley 40. The electric motor 41 driving the head pulley 38 is reversible so that the conveying direction of the belt 42 can be changed between a forward conveying direction toward the head pulley 38, that is, toward the silo downstream end wall 16 and a reverse direction toward the tail pulley 40, that is, toward the silo upstream end wall 18. The material handling apparatus 26 further includes a second or top pair of tracks 44 secured to the silo 10 in spaced apart, parallel relationship to, and above the first pair of tracks 28, and a second or top shuttle car 46 having track engagement wheels 48 contacting the tracks 44 such that the second shuttle car 46 is movable on the tracks 44 in the longitudinal direction of the silo 10 over the top of the first shuttle car 30. Various drive means can be employed for moving the second shuttle car 46 on the tracks 44. For example, the shuttle car 46 can include an electric motor 34 for directly driving the wheels 48 through a drive belt 35. The electric motor 34 is reversible so that the second shuttle car 46 is movable in both directions along the tracks 44, that is, between a forward direction defined as being in the direction toward the discharge end 23 of the floor conveyor 22 or toward the downstream silo end wall 16 and a reverse direction defined as being in the direction away from the discharge end 23 of the floor conveyor 22 or toward the upstream silo end wall 18.

The second or top shuttle car positioning means are included for continuously determining the position of the top shuttle car 46 along the tracks 44. The second shuttle car positioning means can be of various types known to the art, for example, limit switches or photocell devices located at different positions along the length of the track 44, or a potentiometer device associated with the motor which generates a voltage signal. A first preselected voltage signal would correspond to the position of the top shuttle car 46 at the downstream silo end wall 16 and a preselected voltage signal would correspond to the position of the top shuttle car 46 at the upstream silo end wall 18, and various voltage signals between the first and second signals would correspond to given positions between the silo downstream wall 16 and silo upstream wall 18.

Figure 3A:
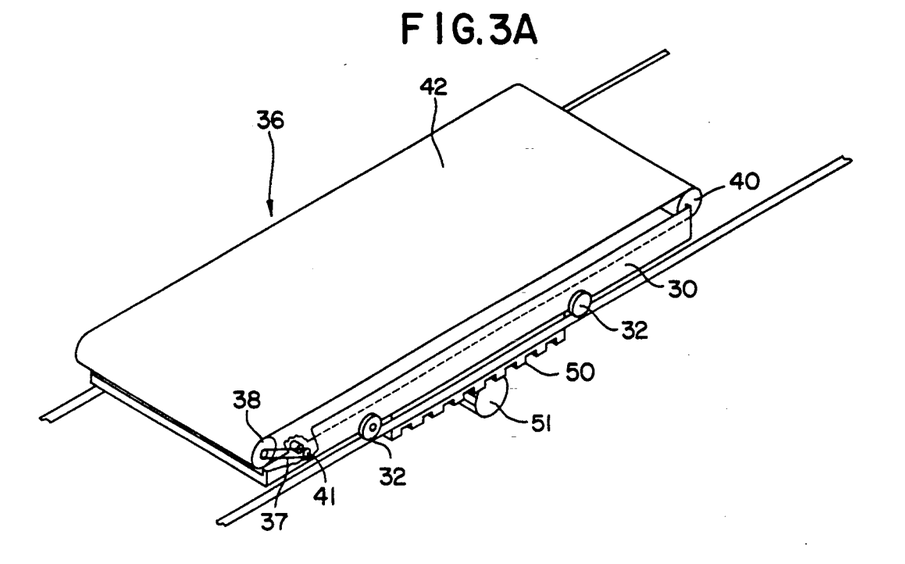
FIG. 3A is an enlarged isometric view of one shuttle car and conveyor of the material handling apparatus of FIG. 1.
Figure 3B:
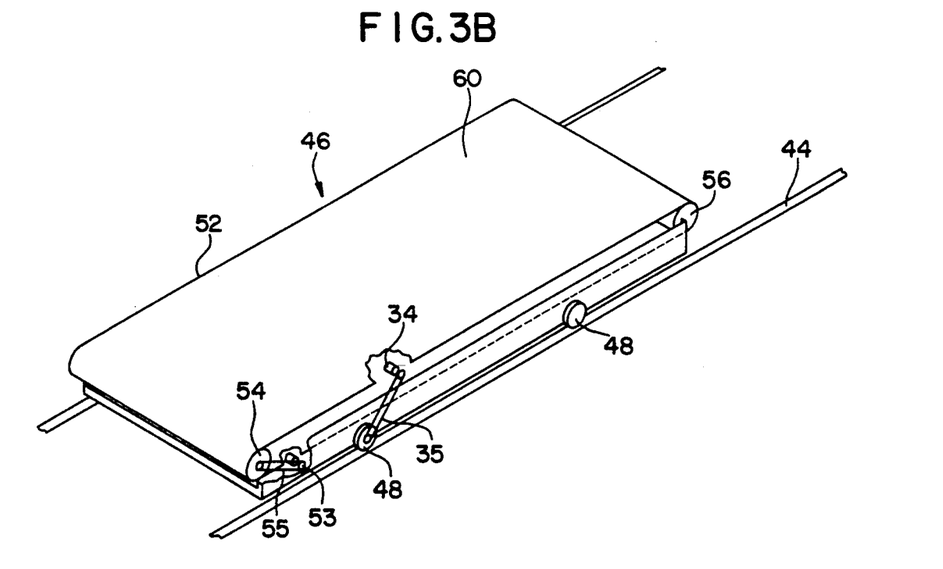
FIG. 3B is an enlarged isometric view of a second shuttle car and conveyor of the material handling apparatus of FIG. 1.
Figure 4:
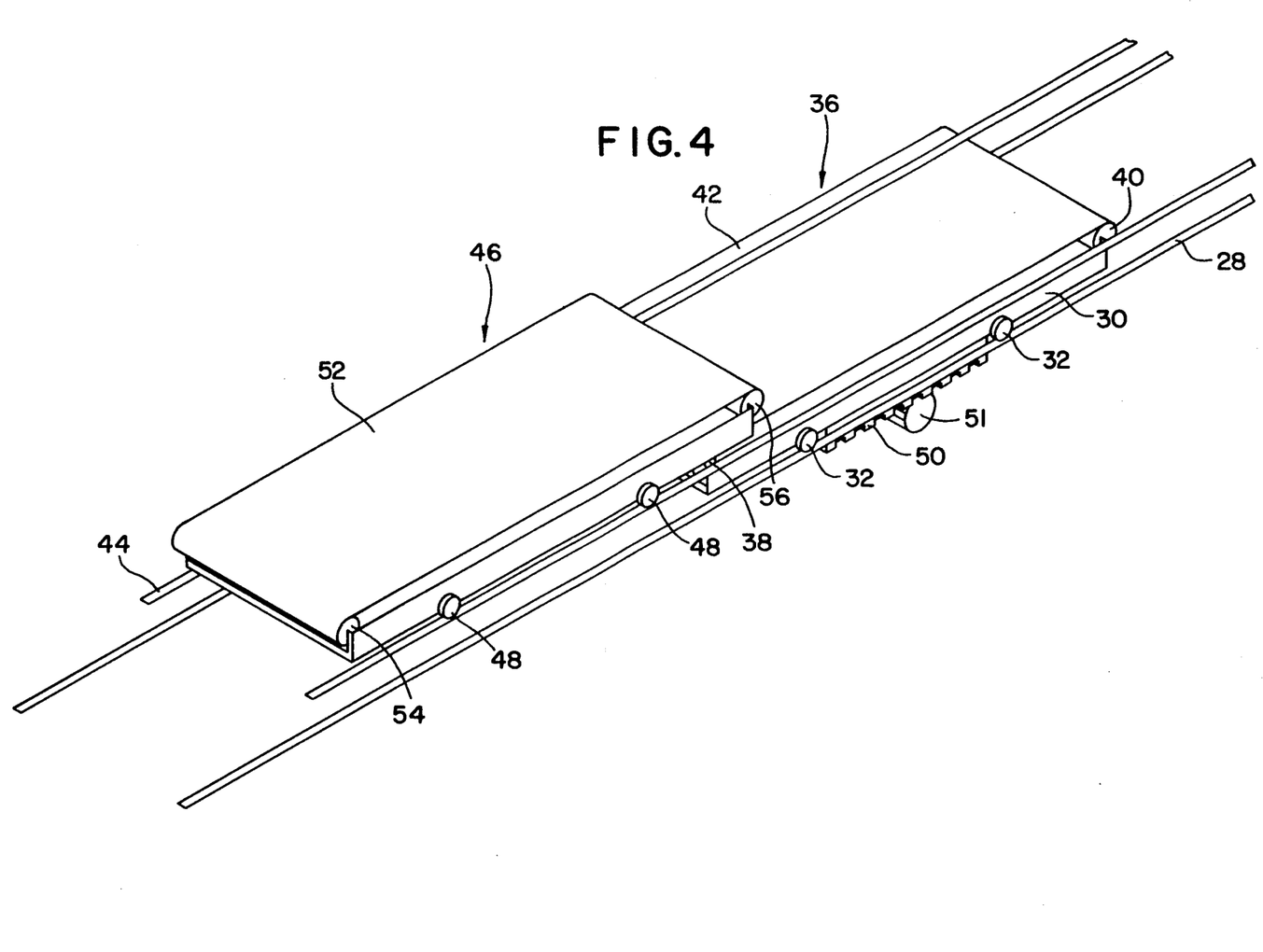
FIG. 4 is an isometric view showing the spatial relationship between the conveyors of FIGS. 3A and 3B.

A second or top belt conveyor apparatus 52 is mounted on the second shuttle car 46 with its conveying direction, that is, direction of belt movement, in alignment with the movement of the second shuttle car 46 on the tracks 44. The second belt conveyor apparatus includes a head pulley 54 drivingly connected to a motor 53 by means of, for example, a drive belt 55, a tail pulley 56, and a continuous belt 60 trained about the head pulley 54 and tail pulley 56. The electric motor 53 driving the head pulley 54 is reversible so that the conveying direction of the belt 60 can be changed between a forward conveying direction toward the head pulley 54, that is, toward the silo downstream end wall 16 and to a reverse direction toward the tail pulley 56, that is, toward the silo upstream end wall 18.

The relative lengths of the first and second shuttle cars 30 and 46, respectively, are determined such that the first shuttle car 30 will move back and forth between the silo downstream end wall 16 and silo upstream end wall 18 while remaining within the confines of the silo 10 defined between the silo downstream end wall 16 and silo upstream end wall 18 so as to reposition the discharge position of the first belt conveyor 36 along the length of the silo 10 over the floor conveyor 22.

Tobacco height determining means such as, for example, photocells 61 ar located at spaced intervals along the length of the silo 10 at predetermined heights above the floor conveyor 22 to detect the height of the tobacco being deposited in the silo 10 by the material handling apparatus 26 as will hereinafter be discussed.

A programmable logic controller is operatively associated with the drive motor 25 of the floor conveyor 22, floor conveyor distance counter means, the drive motor of the pinion gear 51 of the first shuttle car 30, the drive motor 41 of the belt conveyor 36 on the first shuttle car 30, the drive motor 34 of the second shuttle car 46, the second shuttle car positioning means, and the drive motor 53 of the belt conveyor 52 on the second shuttle car 46 for coordinating the movement of the floor conveyor 22, first shuttle car 30 along the track 28, the belt conveyor 36 on the first shuttle car 30, the second shuttle car 46 along the track 44, the belt conveyor 52 on the second shuttle car 46 and the photocells 61, to operate the conveyors and shuttle cars in coordination with each other to either bulk fill the silo 10, or blend fill the silo 10 while the floor conveyor 22 is selectively either stationary or moving to discharge tobacco from the silo 10 as will be hereinafter discussed.

In operation of the present invention distinct batches of tobacco are added to a silo 10 and the silo 10 may be filled and discharged simultaneously. For example, one type of tobacco material may be added to the silo over a predetermined length of the silo to a predetermined height. Another type of tobacco then may be layered over the first type of tobacco to form a second layer of a second type of tobacco and then a third type of tobacco may be added over the top of the first and second layer and upon discharge from the silo 10, the movement of the floor conveyor 22 with three different layers of tobacco will be removed in a mixing operation, in view of the fact that as the conveyor moves, the floor conveyor 22 moves the entire height of the tobacco above the conveyor. And, all three layers of tobacco are being discharged at the same time.

Moreover, in the operation of the present invention the first shuttle car is indexed so that the length of travel will be only a preselected distance beyond the ends of the conveyor belt of the second conveyor so that when the second shuttle car is positioned, the length of the blend end which is being added to the silo will be predetermined. The second shuttle car will be stopped at predetermined positions and the second conveyor will transfer continually material from a feed source to the first conveyor as the first shuttle car moves beneath the second conveyor said preselected distance. Upon obtaining a preselected height of material in the silo 10, the second shuttle car will then be repositioned and the first shuttle car will be indexed to move only a preselected distance along the silo beneath the second conveyor.

Figure 5A:
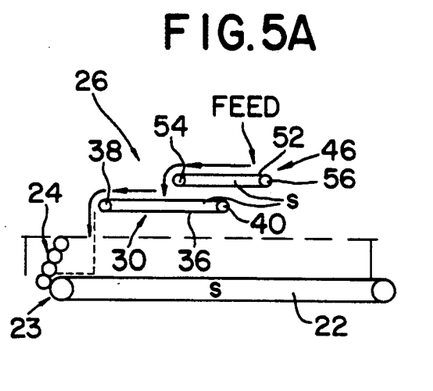
FIGS. 5A–5F sequentially illustrate a blend fill mode of operation of the apparatus of the invention.

Even further, in the operation of the present invention it is possible to fill the silo simultaneously while discharging therefrom. In such a sequence the second shuttle car would be repositioned at different intervals as determined by the movement of the belt conveyor. For example, if the floor conveyor 22 is moving at the rate of 6 inches per minute, then the second shuttle car could be repositioned every minute a total of 6 inches and therefore the silo 10 can be continually discharged and filled at the same rate and blending can also be accomplished by the addition of layers of different tobacco as discussed hereinbefore and as described more fully hereinafter in discussion of FIGS. 5 to 10.

Figure 5B:
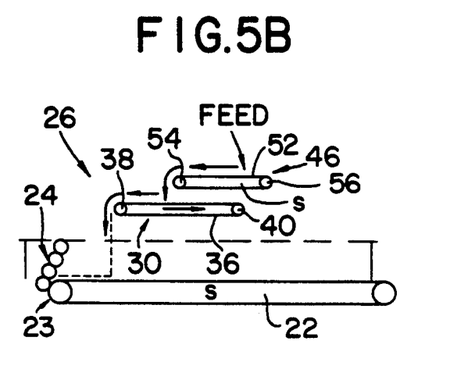
Figure 5C:
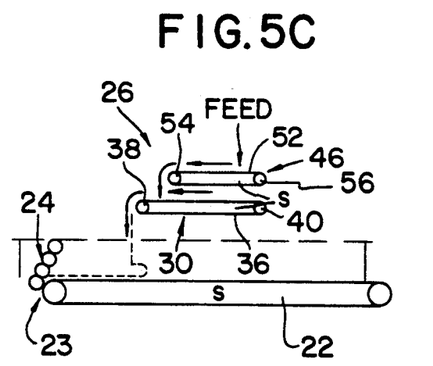
Figure 5D:
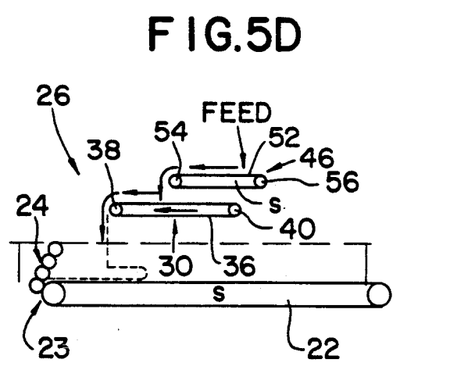
Figure 5E:
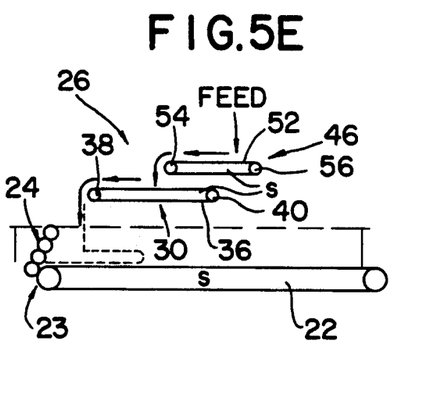
Figure 5F:
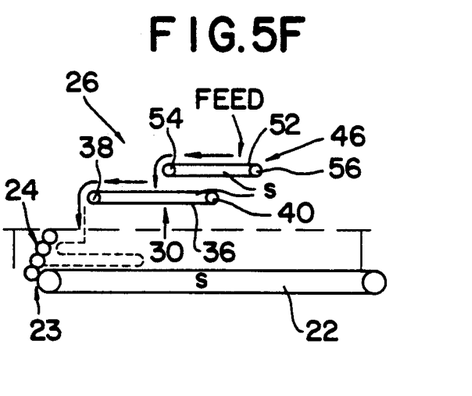

FIGS. 5A-5F illustrate the material handling apparatus 26 of the invention during a cycle of operation to blend fill the empty silo 10 with a first fixed batch size of tobacco, and wherein the silo floor conveyor 22 is stationary so that it is not discharging tobacco from the silo as it is being filled with the batch of blended tobacco. In this mode of operation, as can be seen in FIG. 5A, the floor conveyor 22 is stationary, the bottom shuttle car 30 is initially stationary and located toward the silo downstream end wall 16 (FIG. 1) such that the end of the bottom belt conveyor apparatus 36 having the head pulley 38 is adjacent the silo downstream end wall 16, and the top flight of the bottom conveyor belt 42 of the bottom conveyor apparatus 36 is being driven toward the head pulley 38. The top shuttle car 46 remains stationary and is positioned such that the top belt conveyor apparatus 52 overlaps the bottom belt conveyor apparatus 36 with that end of the top belt conveyor apparatus 52 having the head pulley 54 located between the head pulley 38 and the tail pulley 40 of the bottom belt conveyor apparatus 36, and the top pulley 40 of the bottom belt conveyor apparatus 36, and the top belt flight of the top conveyor belt 60 of the top belt conveyor apparatus 52 is being driven toward the head pulley 54. Tobacco to be loaded into the silo 10 is fed to the top belt conveyor apparatus 52, and the top belt conveyor apparatus 52 deposits the tobacco onto the bottom belt conveyor apparatus 36. The bottom belt conveyor apparatus 36 then deposits the tobacco into the silo 10 near the silo downstream end wall 16. With reference to FIG. 5B, the bottom shuttle car 30 is then driven to move on the bottom tracks 28 in a direction away from the silo downstream end wall 16 while the top shuttle car 46 remains stationary. Therefore, the bottom belt conveyor apparatus 36 deposits a first layer of tobacco into the silo 10. After the bottom shuttle car 30 has been moved a preselected distance to deposit a preselected length of tobacco into the silo, it is momentarily stopped (see FIG. 5C). With reference to FIG. 5D, the direction of travel of the bottom shuttle car 30 is then reversed so that it is driven to move on the bottom tracks 28 in a direction back toward the silo downstream end wall 16 while the top shuttle car 46 remains stationary thereby depositing a second layer of tobacco over the first tobacco layer in the silo 10. After the bottom shuttle car 30 has been moved back to the silo downstream end wall 16, it is momentarily stopped (see FIG. 5E). With reference to FIG. 5F, the direction of the bottom shuttle car 30 is then reversed so that it is driven once again to move in a direction away from the silo downstream end wall 16 while the top shuttle car 46 remains stationary to deposit yet another layer of tobacco on top of the previously deposited tobacco layer. The above discussed procedure is repeated until the fixed batch size of tobacco has been deposited in the silo 10. Note that in this mode of operation, tobacco always discharges from the same end of the top conveyor belt 52 onto the bottom conveyor belt 36 and also from the same end of the bottom conveyor belt 52 throughout the operation.

Figure 6A:
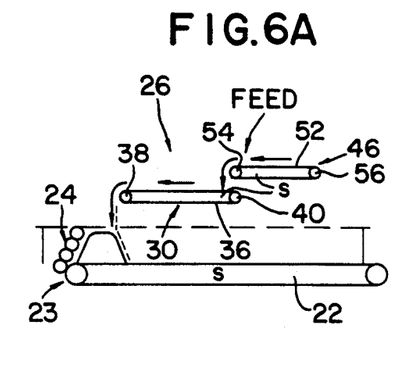
FIGS. 6A–6F sequentially illustrate another mode of operation of the apparatus of the invention.
Figure 6B:
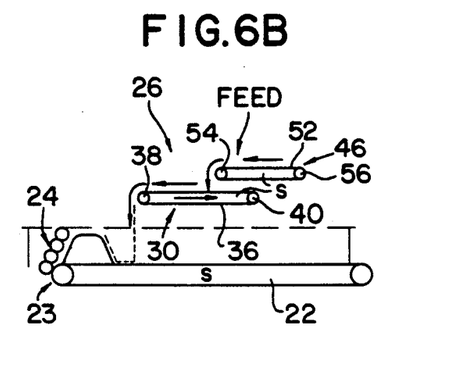
Figure 6C:
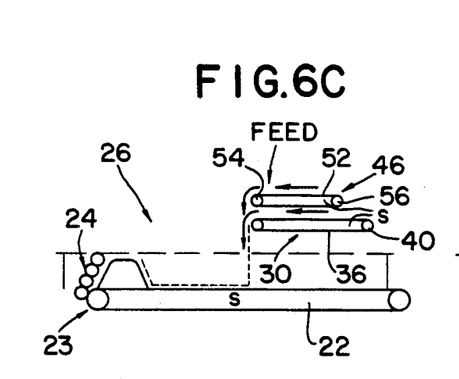
Figure 6D:
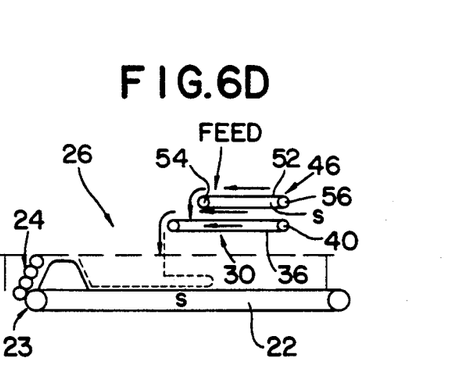
Figure 6E:
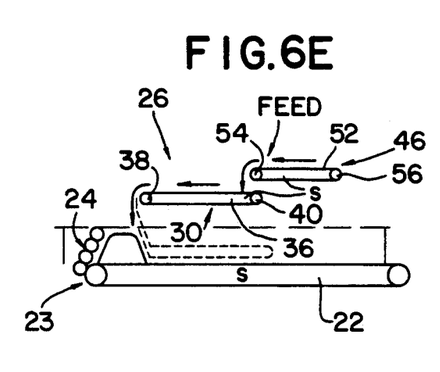
Figure 6F:
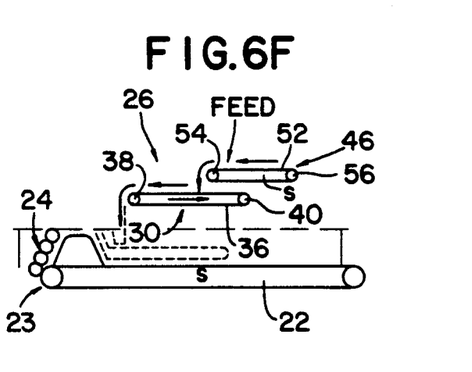

FIGS. 6A-6F illustrate the material handling apparatus 26 of the invention during a cycle of operation to blend fill the silo 10 with another or second fixed size batch of tobacco adjacent a first fixed batch size of tobacco already deposited in the silo 10 by the above described cycle shown in FIGS. 5A-5F, and wherein the silo floor conveyor 22 is stationary so that it is not discharging tobacco from the silo 10 as it is being filled with the second batch of blended tobacco. In this mode of operation, as can be seen in FIG. 6A, and comparing FIG. 6A to FIG. 5A, both the bottom shuttle car 30 and top shuttle car 46 are indexed along the bottom tracks 28 and top tracks 44, respectively, away from the silo downstream end wall 16 a distance approximately equal to the width dimension of the previously deposited first tobacco batch such that the end of the bottom conveyor 36 having the head pulley 38 is adjacent the side of the first tobacco batch. With continued reference to FIG. 6A, the floor conveyor 22 is stationary, the bottom shuttle car 30 is initially stationary, and the top belt flight of the bottom conveyor belt 42 of the bottom conveyor apparatus 36 is being driven toward the head pulley 38. The top shuttle car 46 remains stationary and is positioned such that the top belt conveyor apparatus 52 overlaps the bottom belt conveyor apparatus with that end of the bottom belt conveyor apparatus 36 having the tail pulley 40, and the top belt flight of the top conveyor belt 60 of the top belt conveyor apparatus is being driven toward the head pulley 54. Tobacco to be loaded into the silo 10 is fed to the top belt conveyor apparatus 52, and the top belt conveyor apparatus 52 deposits the tobacco onto the bottom belt conveyor 36. The bottom belt conveyor apparatus 36 then starts to deposit the tobacco into the silo 10 adjacent the previously loaded first tobacco batch previously deposited in the silo 10. With reference to FIG. 6B, the bottom shuttle car 30 is then driven to move on the bottom tracks 28 in a direction away from the first tobacco batch or toward the silo upstream end wall 18 while the top shuttle car 46 remains stationary. Therefore, the bottom belt conveyor apparatus 36 deposits a first layer of tobacco into the silo 10 starting at a point adjacent the first tobacco batch. After the bottom shuttle car 30 has been moved a preselected distance to deposit a preselected length of tobacco into the silo, it is momentarily stopped (see FIG. 6C). With reference to FIG. 6D, the direction of travel of the bottom shuttle car 30 is then reversed so that it is driven to move on the bottom tracks 28 in a direction back toward the silo downstream end wall 16, or first tobacco batch, while the top shuttle car 46 remains stationary thereby depositing a second layer of tobacco over the first tobacco layer in the silo 10. After the bottom shuttle car 30 has been moved back to a location adjacent the first tobacco batch, it is momentarily stopped (see FIG. 6E). With reference to FIG. 6F, the direction of the bottom shuttle car 30 is then reversed so that it is driven once again to move in a direction away from the first tobacco batch, or back toward the silo upstream end wall 18, while the top shuttle car 46 remains stationary to deposit yet another layer of tobacco on top of the previously deposited tobacco layers. The above discussed procedure is repeated until the second batch of preselected size of tobacco has been deposited in the silo 10 next to the first batch of tobacco.

Figure 7A:
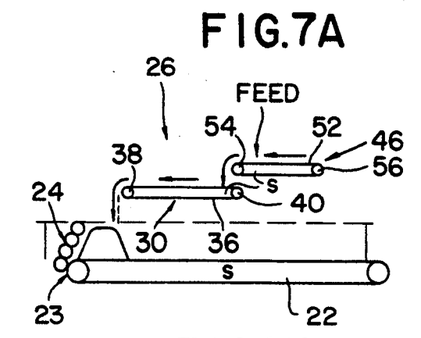
FIGS. 7A–7J sequentially illustrate a further mode of operation of the apparatus of the invention.

FIGS. 7A-7J illustrate the material handling apparatus 26 of the invention during a cycle of operation to simultaneously blend fill the silo 10 with a second fixed sized tobacco batches next to a first fixed size tobacco batch already deposited in the silo 10 by the above described cycle shown in FIGS. 5A-5F, wherein the bottom shuttle car 30 moves back and forth and tobacco is discharged from both ends of the conveyor belt 36 so that the second tobacco batch is formed to fill the silo from the first tobacco batch to the silo upstream end wall 18, and wherein the silo floor conveyor 22 is stationary so that it is not discharging tobacco from the silo 10 as it is being filled. In this mode of operation, as can be seen in FIG. 7A, and comparing FIG. 7A to FIG. 5A, both the bottom shuttle car 30 and top shuttle car 46 are indexed along the bottom tracks 28 and top tracks 44, respectively, away from the silo downstream end wall 16 a distance approximately equal to the width dimension of the first tobacco batch previously deposited such that the end of the bottom conveyor 36 having the head pulley 38 is adjacent the side of the first tobacco batch. With continued reference to FIG. 7A, the floor conveyor 22 is stationary, the bottom shuttle car 30 is initially stationary and the top belt flight of the bottom conveyor belt 42 of the bottom conveyor apparatus 36 is being driven toward the head pulley 38. The top shuttle car 46 remains stationary and is positioned such that the top belt conveyor apparatus 52 overlaps the bottom belt conveyor apparatus with that end of the top belt conveyor apparatus 52 having the head pulley 54 located over that end of the bottom belt conveyor apparatus 36 having the tail pulley 40 and the top belt flight of the top conveyor belt 60 of the top belt conveyor apparatus being driven toward the head pulley 54. Tobacco to be loaded into the silo 10 is fed to the top belt conveyor apparatus 52, and the top belt conveyor apparatus 52 deposits the tobacco out to the bottom belt conveyor 36. The bottom belt conveyor apparatus 36 then starts to deposit an initial amount of tobacco into the silo 10 against the previously loaded first tobacco batch previously formed in the silo 10.

Figure 7B:
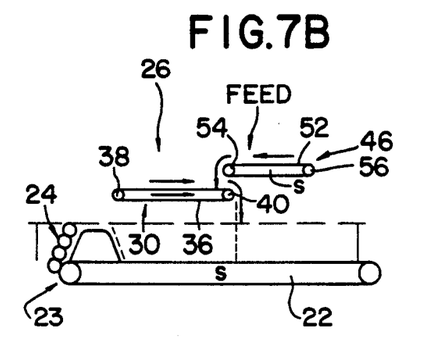
Figure 7C:
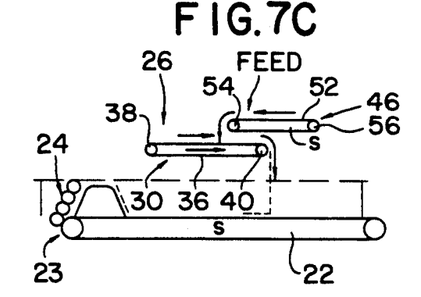
Figure 7D:
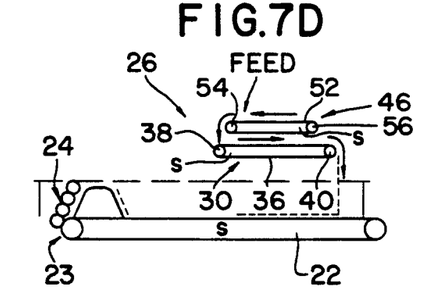
Figure 7E:
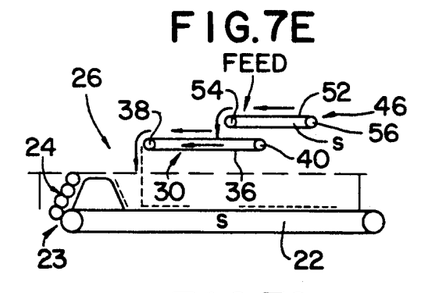
Figure 7F:
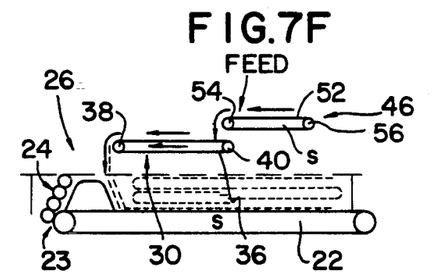
Figure 7G:
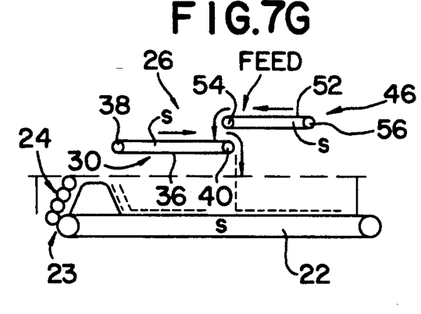
Figure 7H:
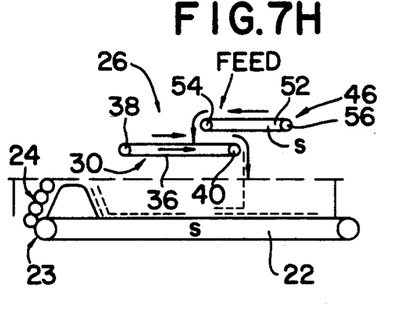
Figure 7I:
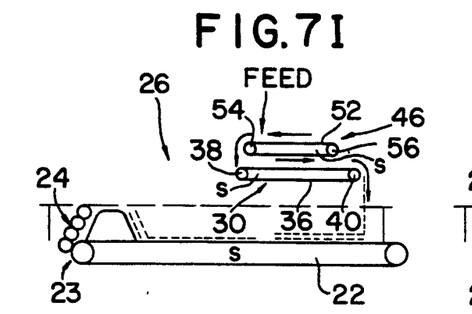
Figure 7J:
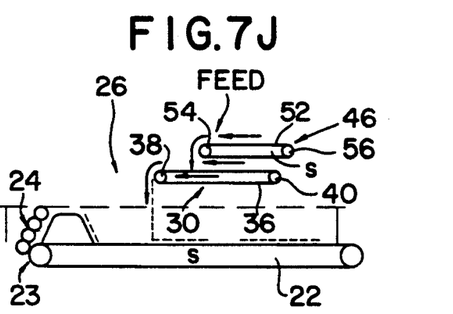

With reference to FIG. 7B, after an initial amount of tobacco has been deposited against the first tobacco batch, the conveying direction of the belt 42 of the bottom conveyor apparatus 36 is changed so that the top flight of the belt 42 is driven toward the tail pulley 40 so that a layer of tobacco is now started to be deposited into the silo 10 spaced a distance away from the first tobacco batch. With reference to FIG. 7C, the bottom shuttle car 30 is then driven to move on the bottom tracks 28 in a direction toward the silo upstream end wall 18 while the top shuttle car 46 remains stationary. Therefore, the bottom belt conveyor apparatus 36 begins depositing a first layer of tobacco into the silo 10 to begin forming a third batch of tobacco spaced apart from the first batch of tobacco until the bottom shuttle car 30 has moved toward the silo upstream end wall 18 to deposit the layer of tobacco of the second batch of tobacco to a location adjacent the upstream silo end wall 18 and at this point, with reference to FIG. 7E (see FIG. 7D), the conveying direction of the belt 42 of the bottom conveyor apparatus 36 is changed so that the top flight of the belt 42 is being driven toward the head pulley 38 and the bottom shuttle car 30 moves back toward the silo downstream end wall 16, or first tobacco batch, continuing to deposit the first layer of tobacco into the silo 10 adjacent to the first tobacco batch previously formed. The bottom shuttle car 30 continues to move toward the first tobacco batch until the first layer of tobacco has been deposited against the first tobacco batch (see FIG. 7F). With reference to FIG. 7G, the conveying direction of the belt 42 of the bottom conveyor apparatus 36 is once again changed so that the top belt flight of the belt 42 is driven toward the tail pulley 40 so that tobacco is now started to be deposited to form a second layer of the second tobacco batch over the first layer. With reference to FIG. 7H, the bottom shuttle car 30 is then driven to move in a direction toward the silo upstream end wall 18 while the top shuttle car 46 remains stationary. Therefore, the bottom belt conveyor apparatus 36 deposits a second layer of tobacco over the first layer continuing to form the second tobacco batch until the bottom shuttle car 30 has moved toward the silo upstream end wall 18 to deposit the second layer of tobacco of the second batch of tobacco to a location adjacent the upstream silo end wall 18 (see FIG. 7I). At this point, with reference to FIG. 7J, the conveying direction of the belt 42 of the bottom conveyor apparatus 42 is changed so that the top flight of the belt 42 is being driven toward the head pulley 38 and the bottom shuttle car 30 moves back toward the silo downstream end wall 16, or first tobacco batch, continuing to deposit the second layer of tobacco into the silo 10. The above procedure is repeated until the second batch has been deposited in the silo 10 filling the silo 10 between the first tobacco batch and the upstream silo end wall 18.

Figure 8A:
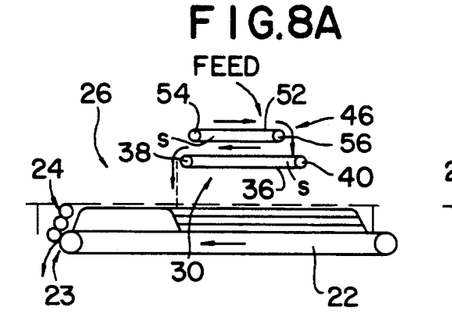
FIGS. 8A–8H sequentially illustrate yet another mode of operation of the apparatus of the invention.
Figure 8B:
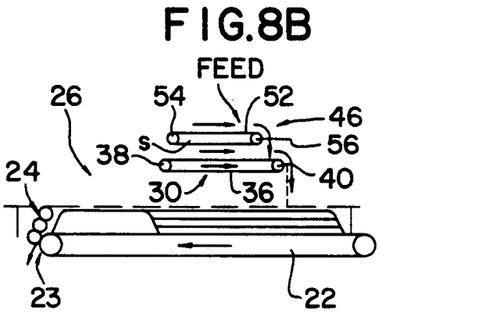
Figure 8C:
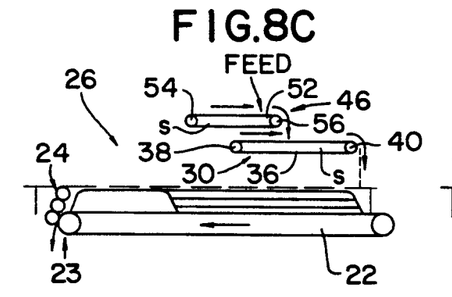
Figure 8D:
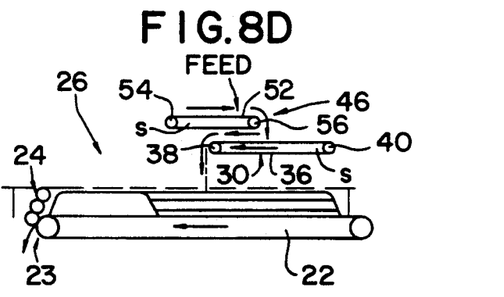
Figure 8E:
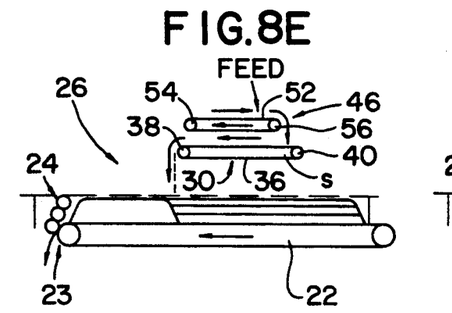
Figure 8F:
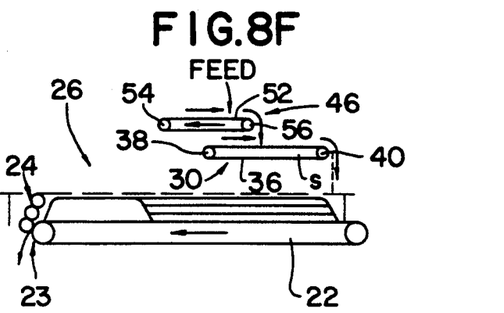
Figure 8G:
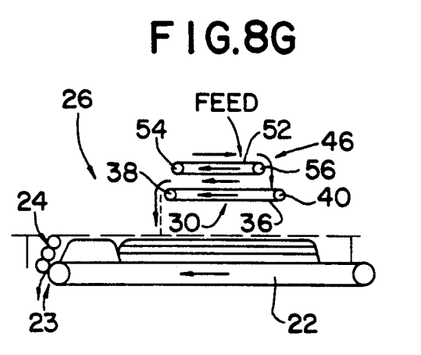
Figure 8H:
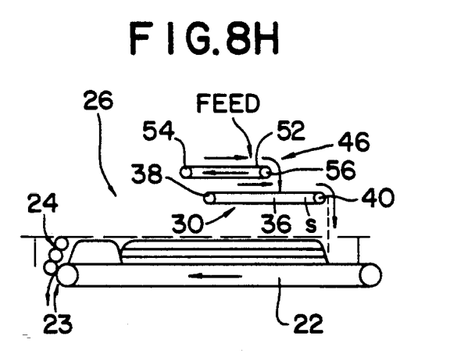

FIGS. 8A-8H illustrate the material handling apparatus 26 of the invention during a cycle of operation to simultaneously blend fill the silo 10 with a second fixed sized tobacco batch adjacent said first tobacco batch already deposited in the silo 10 by the above described cycles shown in FIGS. 5A-5F, and wherein the silo floor conveyor 22 is moving to concurrently and continuously discharge the first tobacco batch from the silo as the second tobacco batch is being continuously formed in the silo 10. In this mode of operation, as can be seen in FIG. 8A, initially the bottom shuttle car 30 is indexed along the tracks 28 such that the end of the bottom conveyor 36 having the head pulley 38 is adjacent the side of the first tobacco batch and that end of the top conveyor 52 having the tail pulley 56 is over the length of the belt 42 of the bottom conveyor 35, the bottom shuttle car 30 and top shuttle car 46 are stationary, the top flight of the belt 42 of the bottom conveyor 36 is being driven toward the head pulley 38, and the top flight of the top conveyor 52 is being driven toward the tail pulley 56. Thusly, tobacco forming the second tobacco batch is initially deposited in the silo 10 immediately adjacent the first tobacco batch. With reference to FIG. 8B, after an initial amount of tobacco forming the second tobacco batch has been deposited, the conveying direction of the bottom conveyor 36 is reversed such that the top flight of the belt 42 is driven toward the end of the bottom conveyor 36 having the tail pulley 40, and the bottom shuttle car 30 is moved toward the upstream silo end wall 18 to deposit a first layer of tobacco forming the second tobacco batch. With reference to FIG. 8C when the bottom shuttle car 30 has moved to the extent to position that end of the bottom conveyor 36 having the tail pulley 40 at the upstream silo end wall 18, the bottom shuttle car 30 is momentarily stopped and the top shuttle car 46 is stationary, whereupon the bottom shuttle car 30 begins to be moved toward the downstream silo end wall 16 (see FIG. 8D) while the top shuttle car 46 and the conveying direction of the belt 42 of the bottom conveyor 36 is changed so that the top flight of the belt 42 now is moved toward the head pulley 38 to again deposit tobacco forming the second tobacco batch. With reference to FIG. 8E, when the bottom shuttle car 30 has moved to the extent to position that end of the bottom conveyor 36 having the head pulley 38 at the end of the first tobacco batch, the bottom shuttle car 30 is momentarily stopped, and the conveying direction of the belt 60 of the top conveyor 52 is moved toward the tail pulley 56, whereupon the bottom shuttle car 30 is once again moved toward the upstream silo end wall 18. With reference to FIG. 8F, the bottom shuttle car 30 continues to move toward the upstream end wall 18 as described in FIG. 8B and 8C until it reaches the upstream end wall 18 continuously forming the second batch. As the silo is continuously being discharged, silo conveyor 22 is moved toward the downstream end wall 16, whereupon the top shuttle car 46 and, in conjunction with the top shuttle car, the bottom shuttle 30 also are moved toward the downstream end wall 16 so as to maintain the forming of the second batch at the tail end of the first batch. With reference to FIG. 8G, the bottom shuttle car 30 is then moved once again toward the downstream end wall 16, and, with reference to FIG. 8H, the bottom shuttle car 30 is then moved toward the upstream end wall 18. This process is repeated until the second tobacco batch is completed while the first tobacco batch is being discharged from the silo 10.

Figure 9A:
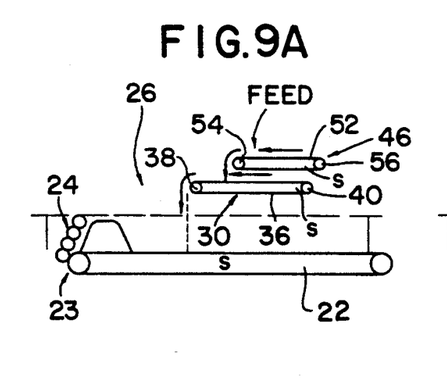
FIGS. 9A–9F sequentially illustrate yet a further mode of operation of the apparatus of the invention.
Figure 9B:
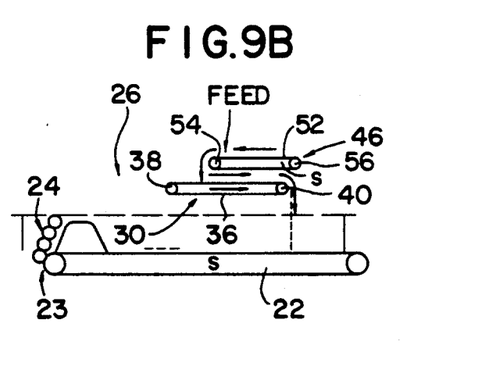
Figure 9C:
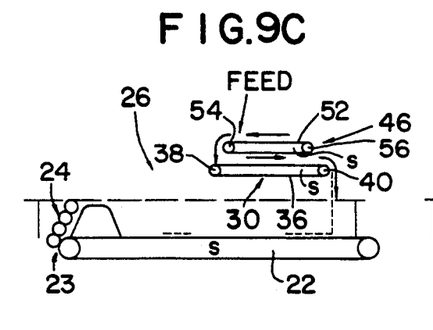
Figure 9D:
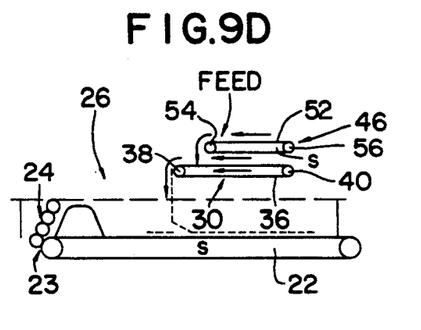
Figure 9E:
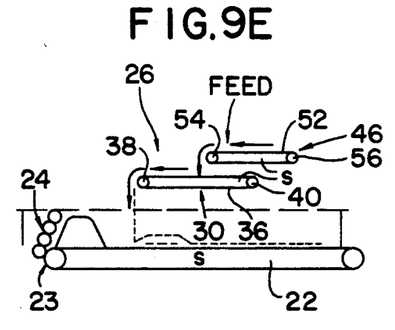
Figure 9F:
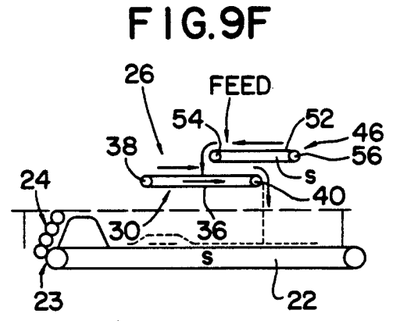

FIGS. 9A-9F illustrate the material handling apparatus 26 of the invention during yet another cycle of operation during a blend fill mode wherein a first batch of tobacco has previously been loaded into the silo by, for example, the process of FIGS. 5A-5F, and another or second batch of tobacco is deposited in the silo at a location spaced a distance along the floor conveyor 22 from the first or previously loaded tobacco batch and the upstream end wall 18 of the silo. This mode of operation is similar to that of FIGS. 8A-8J. As can be best seen in FIG. 9A, the bottom shuttle car 30 is indexed along the tracks 38 such that the end of the bottom conveyor 36 having the head pulley 38 is spaced from the free side of the first tobacco batch and that end of the top conveyor 52 having the head pulley 54 is over the length of the belt 42 of the bottom conveyor 36, the bottom shuttle car 30 and top shuttle car 46 are stationary, the top flight of the belt 42 of the bottom conveyor 36 is being driven toward the head pulley 38, and the top flight of the top conveyor 52 is being driven toward the head pulley 54. Thusly, tobacco forming the second tobacco batch is initially deposited in the silo 10 spaced a distance from the first tobacco batch. With reference to FIG. 9B, after an initial amount of tobacco forming the second tobacco batch has been deposited, the conveying direction of the bottom conveyor 36 is reversed such that the top flight of the belt 42 is driven toward the end of the bottom conveyor 36 having the tail pulley 40, and the bottom shuttle car 30 is moved toward the upstream silo end wall 18 to initially deposit another initial amount of tobacco forming the second tobacco batch at a distance from that initial amount deposited in FIG. 9A. When the bottom shuttle car 30 has moved to the extent to position that end of the bottom conveyor 36 having the tail pulley 40 at the upstream silo end wall 18, the bottom shuttle car 30 is momentarily stopped (see FIG. 9C), whereupon the bottom shuttle car 30 begins to move toward the downstream silo end wall 16 thereby depositing a first layer of tobacco in the silo 10 forming the second tobacco batch spaced from the first batch (see FIG. 8E). When the bottom shuttle car 30 has moved to the extent to again position that end of the bottom conveyor 36 having the head pulley 38 over the amount of tobacco initially deposited as in FIG. 9A, the bottom shuttle car 30 is again moved back toward the downstream silo end wall 18 thereby depositing another layer of tobacco forming the second tobacco batch in the silo (see FIG. 9F). This mode of operation provides for filling the silo with two different types or grades of tobacco.

Figure 10A:
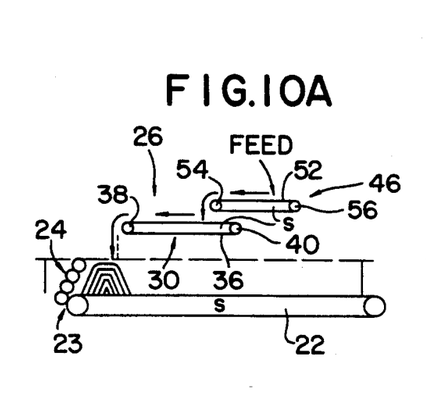
FIGS. 10A–10F sequentially illustrate a bulk fill mode of operation of the apparatus of the invention.
Figure 10B:
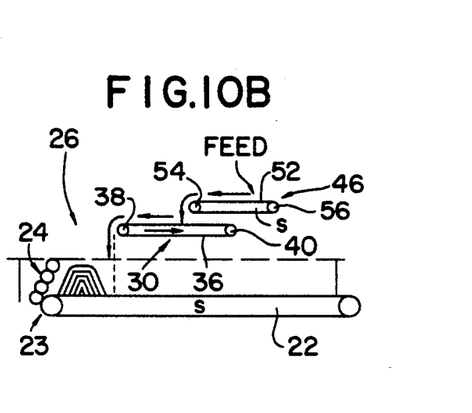
Figure 10C:
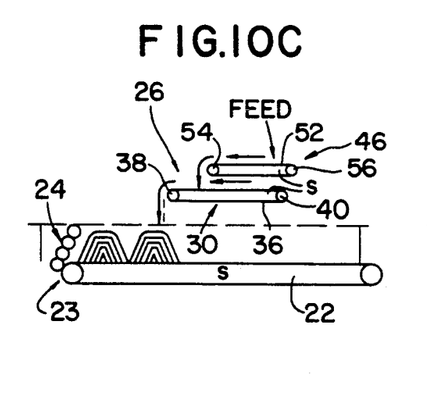
Figure 10D:
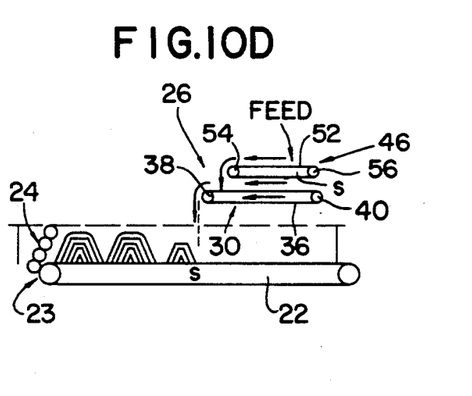
Figure 10E:
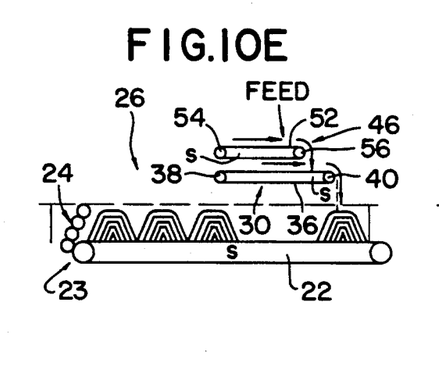
Figure 10F:
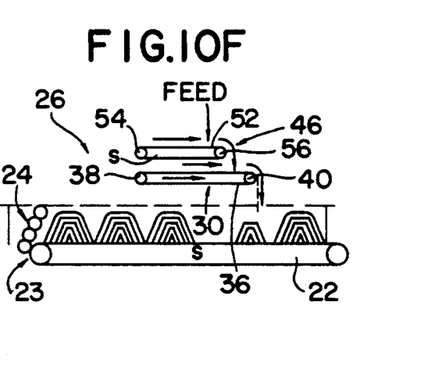

Now with reference to FIGS. 10A-10F, there is illustrated a bulk fill mode of operation of the material handling apparatus 26 of the present invention. The silo floor conveyor 22 is stationary so that it is not discharging tobacco from the silo as it is being bulk filled with batches of tobacco. In this mode of operation as can be seen in FIG. 10A, the bottom shuttle car 30 is initially stationary and located toward the silo downstream end wall 1 such that the end of the belt conveyor apparatus 36 having the head pulley 38 is spaced a preselected distance from the silo downstream end wall 16, and the top flight of the bottom conveyor belt 42 is being driven toward the head pulley 38. The top shuttle car 46 remains stationary and is positioned such that the top belt conveyor apparatus 52 overlaps the bottom belt conveyor apparatus 36 with that end of the top belt conveyor apparatus 52 having the head pulley 54 located between the head pulley 38 and tail pulley 40 of the bottom belt conveyor apparatus 36, and the top belt flight of the top conveyor belt 60 of the top belt conveyor apparatus 52 being driven toward the head pulley 54. Tobacco to be bulk loaded into the silo 10 is fed to the top belt conveyor apparatus 52, and the top belt conveyor apparatus 52 deposits the tobacco onto the bottom belt conveyor apparatus 36. The bottom belt conveyor apparatus 36 then deposits the tobacco into the silo 10 from the end of the bottom conveyor 36 at the head pulley 38 until a first batch of tobacco of a preselected height has been deposited in the silo 10 adjacent the silo downstream end wall 16. With reference to FIG. 10B, after the first bulked batch of tobacco has been deposited, the bottom shuttle car 30 is indexed a preselected distance away from the first bulk batch until the end of the bottom conveyor 36 having the head pulley 38 is spaced from the first bulk batch longitudinally of the floor conveyor 22 and a second bulk batch of tobacco is deposited in the silo 10 adjacent the first bulk batch. With reference to FIG. 10C, after the second batch of a preselected height has been deposited, the bottom shuttle car 30 is again indexed a preselected distance away from the second bulk batch until the end of the bottom conveyor 36 having the head pulley 38 is spaced from the second bulk batch of tobacco longitudinally of the floor conveyor 22 and a third bulk batch of tobacco is deposited in the silo 10 adjacent the second bulk batch. This process is repeated until the end of the bottom conveyor 36 having the tail pulley 40 is generally adjacent the silo upstream end wall 18 (see FIG. 10D). With continued reference to FIG. 10D, at this time the conveying direction of the bottom conveyor 36 is changed so that the top flight is driven toward the tail pulley 40 so that a fourth bulk batch of tobacco is deposited in the silo 10 adjacent the silo upstream end wall 18 until the fourth tobacco bulk batch has reached a preselected height. With reference to FIG. 10E, at this time, the bottom shuttle car 30 is indexed a preselected distance away from the fourth bulk batch in a longitudinal direction of the floor conveyor 22 back toward the silo 10 downstream end wall 16 until the end of the bottom conveyor 36 having the tail pulley 40 is spaced from the fourth bulk batch and fifth bulk batch of tobacco is deposited in the silo 10 from the tail pulley end of the bottom conveyor 36 adjacent the fourth bulk batch (see FIG. 10F). This process is continued until the silo 10 is filled with bulk batches of tobacco.

The above description of the various modes of operation demonstrate the versatility of the present invention.

The foregoing detailed description is given primarily for clearness of understanding and no unnecessary limitations are to be understood therefrom, for modifications will become obvious to those skilled in the art upon reading this disclosure and may be made without departing from the spirit of the invention and scope of the appended claims.

What is claimed is:

1. A material handling apparatus for selectively bulk filling and blend bulk filling an open topped elongated silo, comprising:
    an elongated silo having a length and a width, said length being much greater than said width, said silo having an open top and a bottom;
    a floor discharge conveyor for moving material, said floor discharge conveyor being mounted along said bottom;
    a first shuttle car;
    means for mounting the first shuttle car over the top of the silo for movement along the length of the silo;
    means for indexing a length of travel of said first shuttle car;
    means for selectively moving the first shuttle car along the length of the silo on the first shuttle car mounting means;
    a first belt conveyor mounted on the first shuttle car for conveying in directions in alignment with movement of the first shuttle car on the first shuttle car mounting means;
    a second shuttle car;
    means for mounting the second shuttle car over the top of the silo and above the first shuttle car for movement along the length of the silo;
    means for positioning said second shuttle car;
    means for selectively moving the second shuttle car in either direction along the length of the silo on the second shuttle car mounting means;
    a second belt conveyor mounted on the second shuttle car for conveying in directions in alignment with movement of the second shuttle car on the second shuttle car mounting means; and means to move said second belt conveyor in response to a movement of said floor discharge conveyor.

2. The material handling apparatus of claim 1, wherein:

the first belt conveyor is no longer than about one-quarter of the length of the silo; and the second belt conveyor is no longer than about one-quarter of the length of the silo.

3. The material handling apparatus of claim 1 wherein said floor conveyor includes a continuous belt and means for counting a distance the belt has traveled at any given time.

4. The material handling apparatus of claim 1 including a tobacco height determining means located at spaced intervals along the length of said silo.

5. The material handling apparatus of claim 1 including a programmable logic controller including means therein to control said conveyors and said shuttle cars in filling said silo.

6. The apparatus of claim 1 wherein said first shuttle car moves a preselected distance in relation to said second shuttle car.

7. The apparatus of claim 1 wherein said second shuttle car moves a preselected distance in response to the movement of said floor conveyor.

* * * * *